(12) United States Patent
Bohmer (10) Patent No.: US 7,490,509 B2
(45) Date of Patent: Feb. 17, 2009

(54) OPAQUE AEROSOL CONTAINER CAPACITY INDICATOR

(75) Inventor: William Bohmer, Succasunna, NJ (US)

(73) Assignee: Display Matrix Corporation, Randolph, NJ (US)

( * ) Notice: Subject to any disclaimer, the term of this patent is extended or adjusted under 35 U.S.C. 154(b) by 102 days.

(21) Appl. No.: 11/487,763

(22) Filed: Jul. 17, 2006

(65) Prior Publication Data
US 2007/0062521 A1     Mar. 22, 2007

Related U.S. Application Data

(60) Provisional application No. 60/717,816, filed on Sep. 16, 2005.

(51) Int. Cl.
*G01F 17/00* (2006.01)
(52) U.S. Cl. .......................... 73/149; 222/23
(58) Field of Classification Search ............. 73/149; 116/276, 334, 335; 222/23
See application file for complete search history.

(56) References Cited

U.S. PATENT DOCUMENTS 3,178,071 A * 4/1965 Gentoso ............... 222/402.13
5,405,051 A * 4/1995 Miskell .................... 222/23
2005/0199744 A1* 9/2005 Bohmer .................... 239/71

FOREIGN PATENT DOCUMENTS

JP        2000281156 A  * 10/2000
JP        2000327053 A  * 11/2000

* cited by examiner

*Primary Examiner*—Hezron Williams
*Assistant Examiner*—Nashmiya S Fayyaz
(74) *Attorney, Agent, or Firm*—John Q. McQuillan (57) ABSTRACT

An aerosol capacity indicator that utilizes a novel and inexpensive display that can be installed in the actuator of an aerosol can to display the amount of product remaining therein. The novel accumulative pressure indicator display is imbedded in the actuator which is attached to the valve of an aerosol can and activated by pressure applied directly by the user in the form of finger contact with the actuator. The total amount of pressure applied to the indicator and transferred to the aerosol valve by means of direct user contact both intermittent and continuous renders a relevant reading equivalent to the amount of product released from the aerosol can without any contact with the actual dispensed material. Another embodiment of the invention utilizes the pressure of the actual aerosol product as it passes through the actuator making intermittent and continuous contact with the novel accumulative pressure indicator display imbedded in the flow path of the aerosol product in the actuator rendering an actual reading equivalent to the amount of product released from the aerosol can.

4 Claims, 11 Drawing Sheets

OPAQUE AEROSOL CONTAINER CAPACITY INDICATOR

This application claims benefit of application Ser. No. 60/717,816 filed Sep. 16, 2005.

BACKGROUND OF THE INVENTION

Products such as hair spray and shaving cream that are sold in containers such as aerosol cans are usually opaque because the pressure required to facilitate the dispensing of the product must be contained in a strong container. The container must be strong enough to withstand substantial internal pressures that are used to force the product out of the container via an outlet that is opened and closed by means of a valve that is activated by the user of the product. Opaque metal cans are generally used instead of transparent materials such as glass to insure that the container can withstand the internal pressure and external handling. Unlike a transparent container you cannot see how much product is remaining in the can after you begin dispensing the product. It is desirable to know how much product remains in a can.

SUMMARY OF THE INVENTION

The object of the invention is to use a novel and inexpensive display that can be installed in the actuator of an aerosol can to display the amount of product remaining therein. The actuator is the component of an aerosol that is attached to the valve opening of an aerosol so that pressure can be applied to overcome the valve allowing material inside the can to escape through a tunnel formed in the actuator. The invention utilizes a novel accumulative pressure indicator display imbedded in the actuator which is attached to the valve of an aerosol can and activated by pressure applied directly by the user in the form of finger contact with the actuator. The total amount of pressure applied to the indicator by means of direct user contact both intermittent and continuous renders a relevant reading equivalent to the amount of product released from the aerosol can without any contact with the actual dispensed material.

Another embodiment of the invention is to utilize the total amount of pressure of the actual aerosol product as it passes through the actuator making intermittent and continuous contact with the novel accumulative pressure indicator display imbedded in the actuator rendering an actual reading equivalent to the amount of product released from the aerosol can.

DESCRIPTION OF THE PREFERRED EMBODIMENTS

Figure 1:
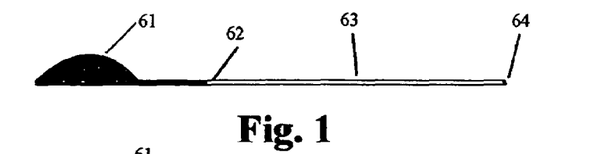
FIG. 1 is a cross section view of a flexible gel filled blister and the capillary extending from the flexible gel filled blister.
Figure 2:
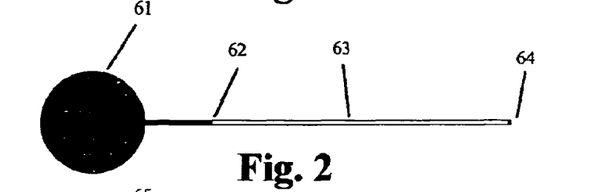
FIG. 2 is a top view of a flexible gel filled blister and capillary extending from the flexible gel filled blister.
Figure 3:
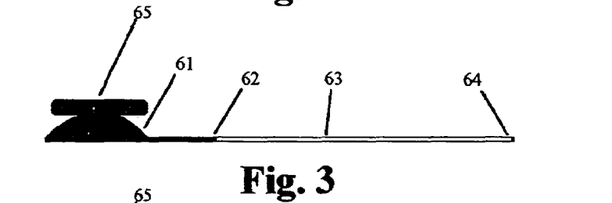
FIG. 3 is a cross section view of the flexible gel filled blister and the capillary extending from the flexible gel filled blister with a flat support member resting on the blister.
Figures 4, 5, 6:
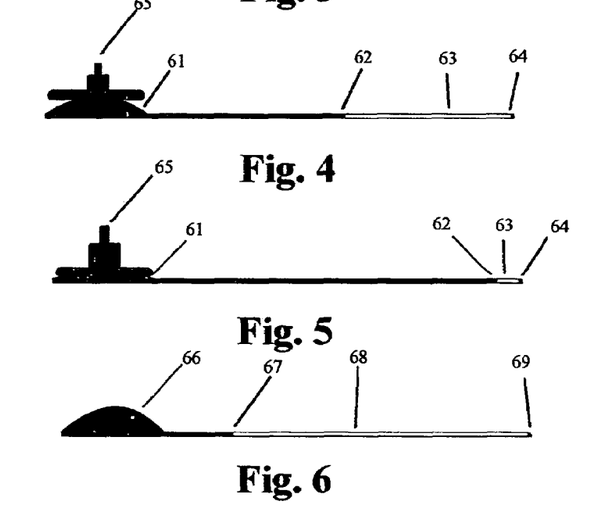
FIG. 4 is a cross section view of the flexible gel filled blister and the capillary extending from the flexible gel filled blister with a flat support member holding a small weight partially compressing the blister.
FIG. 5 is a cross section view of the flexible gel filled blister and the capillary extending from the flexible gel filled blister with a flat support member holding a heavy weight completely compressing the blister.
FIG. 6 is a cross section view of the wide flexible gel filled blister and the capillary extending from the flexible gel filled blister.
Figure 7:
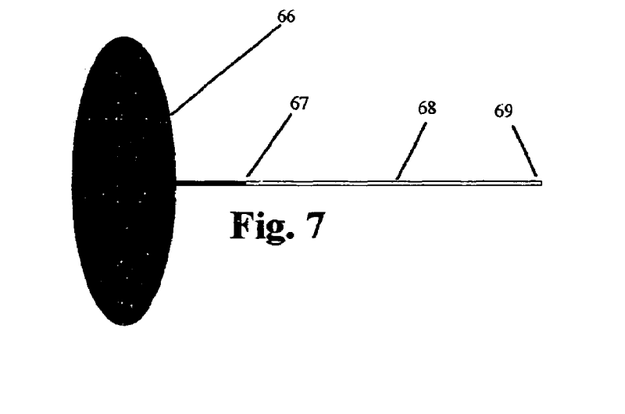
FIG. 7 is a top view of the wide flexible gel filled blister and the capillary extending from the flexible gel filled blister.

FIG. 1 and FIG. 2 show a cross sectional and plane view of an enclosed system comprised of a gel filled flexible film blister 61 and a narrow capillary tube 63 extended from said blister with the gel partially entering the capillary 62. The end of the capillary 64 is left open to allow air to escape when necessary. FIGS. 3, 4 and 5 are cross sectional views of the effect of weight or pressure 65 on the flexible gel blister 61 which forces the edge of the gel supply 62 to advance through the capillary 63. In FIG. 3 there is a small weight or pressure 65 on the flexible gel blister 61 forcing only a small amount of the gel supply to advance through the capillary 63 to a position 62 close to the blister 61 representing low weight or pressure. In FIG. 4 there is a larger weight or pressure 65 on the flexible gel blister 61 forcing a larger amount of the gel supply to advance through the capillary 63 to a position 62 further from the blister 61 representing a larger weight or pressure. In FIG. 5 there is a maximum weight or pressure 65 on the flexible gel blister 61 forcing the maximum amount of the gel supply to advance through the capillary 63 to a position 62 furthest from the blister 61 representing the maximum weight or pressure. The flexible gel blister 61 is substantially larger than the capillary 63 wherein a very small amount of weight or pressure 65 on the blister 61 renders a large movement of the gel 62 in the capillary 63 rendering a system than can detect and display small changes in the weight or pressure 65 applied to the blister 61. FIGS. 6 and 7 show a cross sectional and plane view of an enclosed system comprised of a very wide gel filled flexible film blister 66 and a narrow capillary tube 68 extended from said blister with the gel partially entering the capillary 67. The end of the capillary 69 is left open to allow air to escape when necessary. The enclosed system shown in FIG. 6 and FIG. 7 is the same as the system in shown in FIGS. 1 and 2 except that with the wider and larger blister 66 the system renders a more sensitive movement of the gel 67 through the capillary 68. The combination of a large blister 66 and a small capillary 68 creates a visual amplifier that detects small changes in the weight and pressure placed on the blister.

Figure 8:
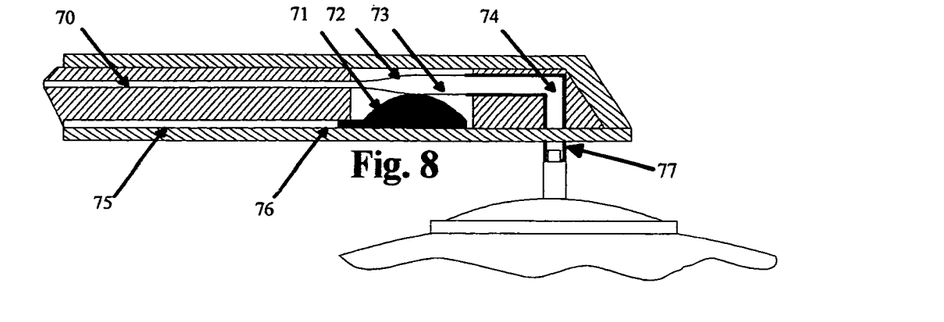
FIGS. 8, 9, 10 & 11 are cross sectional views of an aerosol actuator button containing the indicator and outlet tunnel of which a portion of the walls are elastic and is parallel to the gel blister or the product that is connected to the valve output opening.
Figure 9:
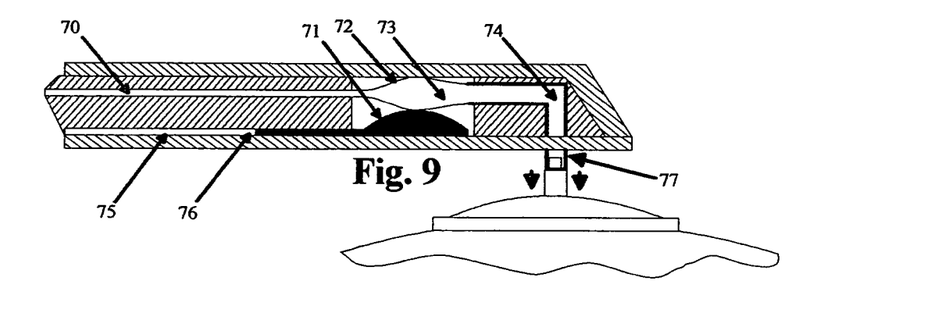
Figure 10:
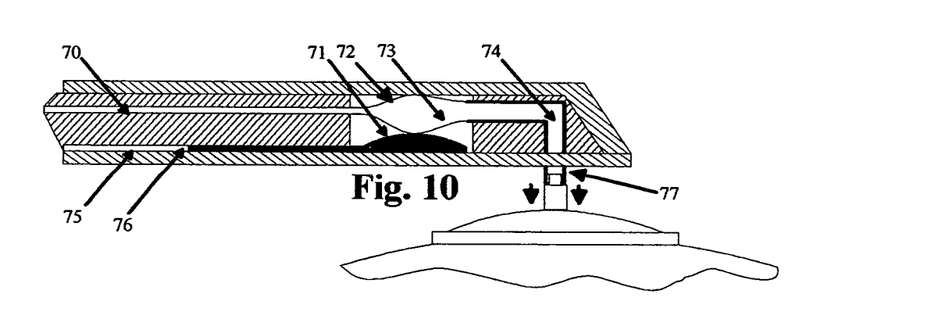
Figure 11:
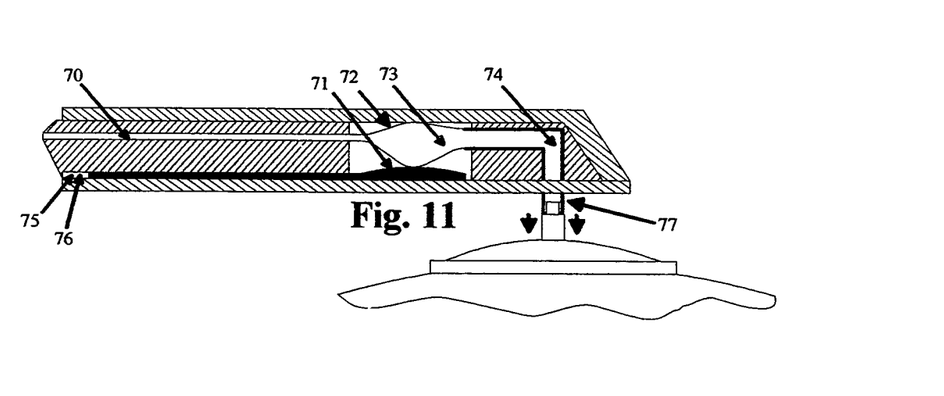

The next step is to use the indicating system described above and install it in a actuator on an aerosol can to record intermittent and continuous discharge of product from an aerosol can. In FIGS. 8 through 11 a cross sectional view of one embodiment is shown which shows the gel reservoir of the gel capillary indicator sharing and interacting in an enclosure in an actuator assembly with an elastic section of the aerosol output tunnel. The viscosity of the gel material will be high enough to offer resistance and a memory effect in that once the gel is moved by a given force or pressure it will remain in place until it is moved again. In FIG. 8 the gel reservoir blister 71 which is full of gel is in contact with the elastic wall section 72 of the aerosol output tunnel which is between the ninety degree turn 74 and the narrow tunnel opening 74. The gel reservoir blister 71 is full and there is no pressure present in the elastic section of the tunnel 73 and no expansion of the wall 72 in that there is no product moving through the tunnel from the input section of the tunnel 77 resulting in no movement of the leading edge of the gel 76 through the capillary 75. In FIG. 9 the product is introduced into the tunnel input 77 causing the wall 72 of the elastic section 73 of the tunnel to expand as a result of back pressure developed by the product pushing against the narrow tunnel opening 70 which in turn presses against the gel reservoir blister 71 resulting in movement of gel 76 a certain distance into the capillary 75. The gel 76 location in the capillary 25 renders a visual representation of the accumulative amount of product that passed through the tunnel from the source 77. In FIG. 10 the product continues into the tunnel input 77 causing the wall 72 of the elastic section 73 of the tunnel to expand further as a result of back pressure developed by the product pushing against the narrow tunnel opening 70 which in turn continues to press against the gel reservoir blister 71 resulting in movement of gel 76 a greater distance into the capillary 75. The gel 76 location in the capillary 25 renders a visual representation of the accumulative amount of product that passed through the tunnel from the source 77. In FIG. 11 the remaining product continues into the tunnel input 77 causing the wall 72 of the elastic section 73 of the tunnel to expand a maximum amount as a result of back pressure developed by the product pushing against the narrow tunnel opening 70 which in turn continues to press against the gel reservoir blister 71 resulting in movement of gel 76 a maximum distance into the capillary 75. The gel 76 location in the capillary 25 renders a visual representation of the total accumulative amount of product that passed through the tunnel from the source 77. In FIGS. 12 through 15 a top and cross sectional view of another embodiment is shown which is an aerosol actuator with a capacity indictor installed therein.

Figure 12:
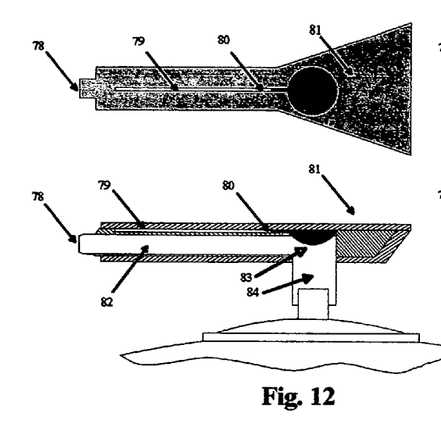
FIGS. 12, 13, 14 & 15 are top and cross sectional views of an aerosol actuator button containing the indicator and product outlet tunnel of which a portion of the output tunnel is partially blocked by a gel blister and capillary assembly which interacts and records movement of the product as it passes through the tunnel.
Figure 13:
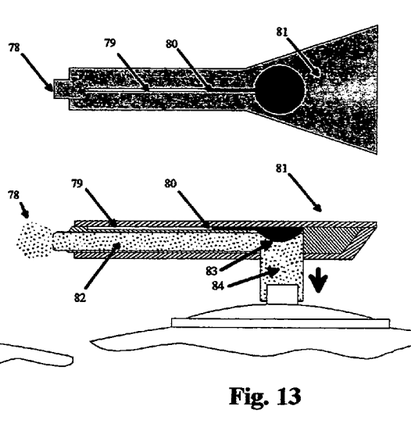
Figure 14:
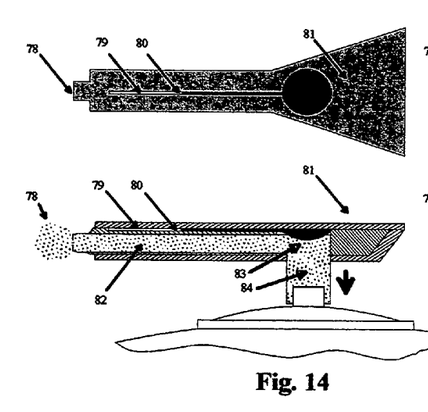
Figure 15:
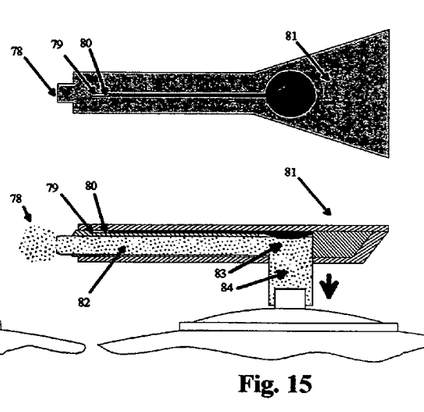
Figure 16:
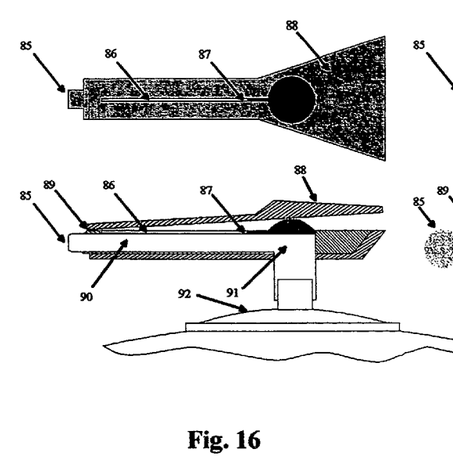
FIGS. 16, 17, 18, 19, 20 & 21 are top and cross sectional views of an aerosol actuator button containing the indicator and product outlet tunnel with a gel blister and capillary assembly located above the product outlet tunnel in between the actuator button and the product output tunnel which interacts and records intermittent and continuous pressure applied to the actuator by the user.
Figure 17:
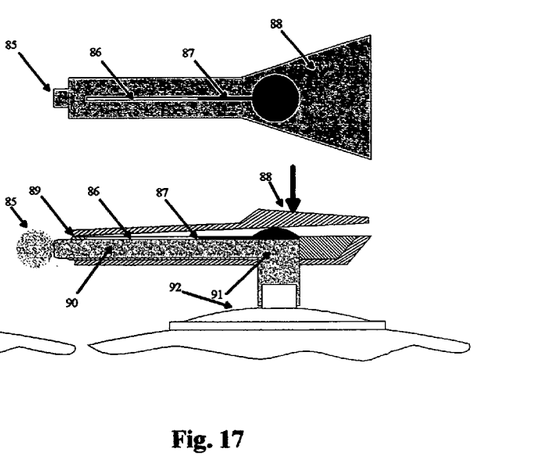
Figure 18:
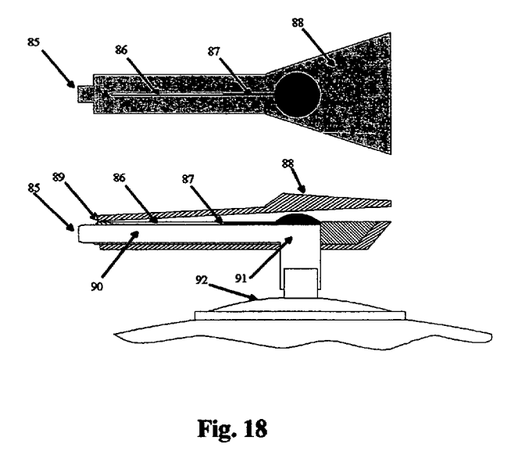
Figure 19:
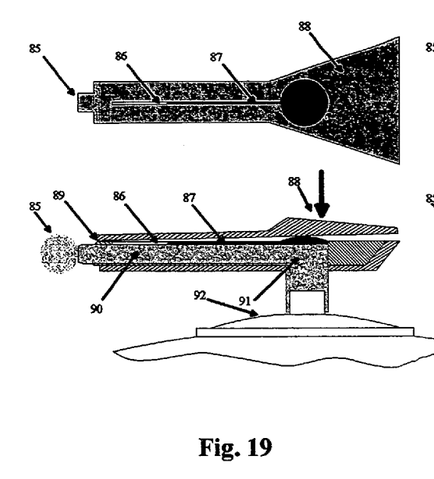
Figure 20:
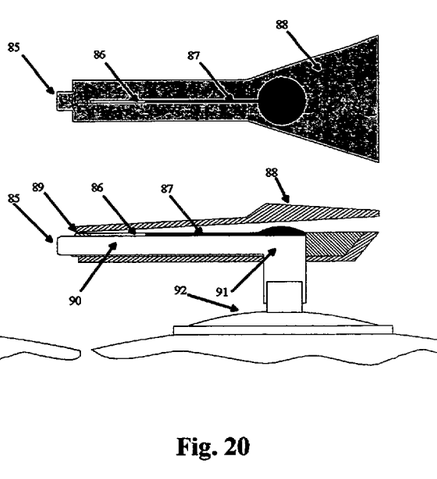
Figure 21:
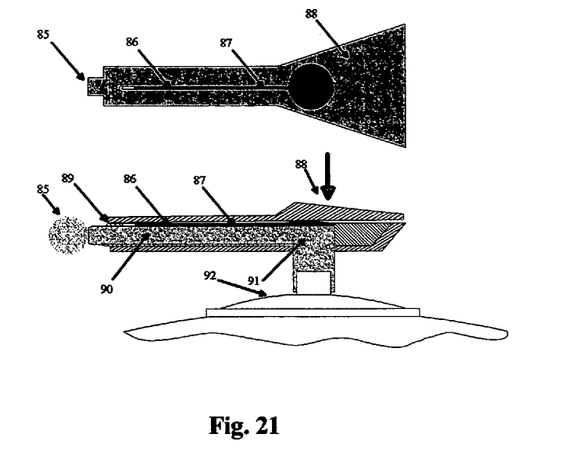
Figure 22:
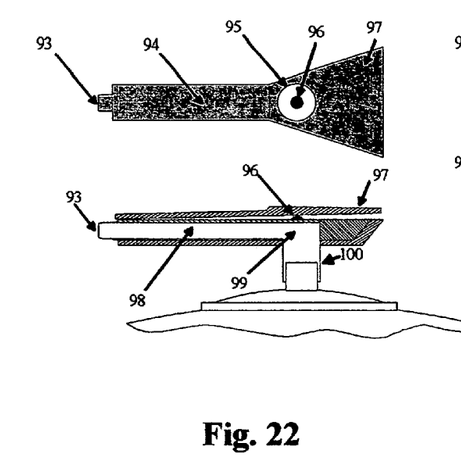
FIGS. 22, 23, 24, 25, 26, 27 & 28 are top and cross sectional views of an aerosol actuator button containing the indicator and product outlet tunnel with a small diameter compressible thick gel blister assembly located above the product outlet tunnel in between the actuator button and the product output tunnel which interacts and records intermittent and continuous pressure applied to the actuator by the user.
Figure 23:
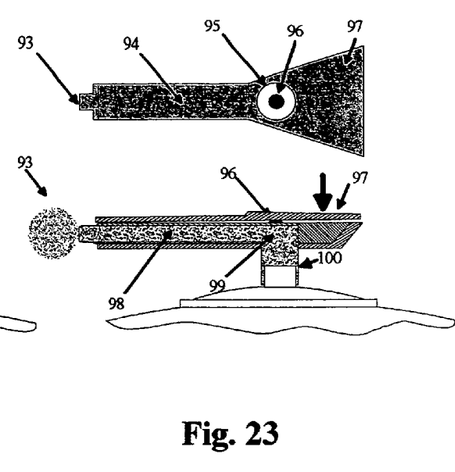
Figure 24:
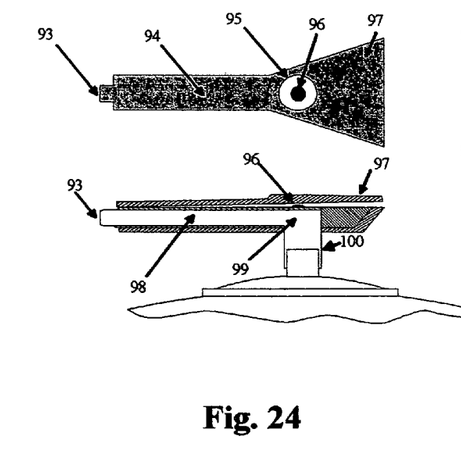
Figure 25:
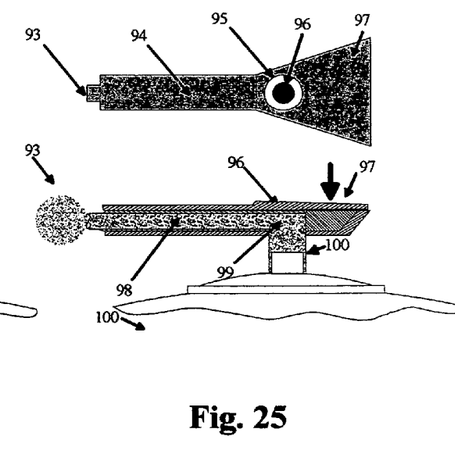
Figure 26:
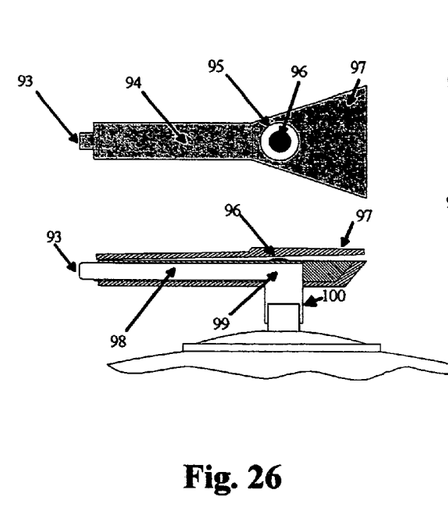

Another embodiment is shown in FIGS. 12 through 15 which show a more detailed variation of the embodiment shown in FIGS. 8 through 11. The viscosity of the gel material will be high enough to offer resistance and a memory effect in that once the gel is moved by a given force or pressure it will remain in place until it is moved again. In FIG. 12 the cross section view shows the actuator 81 with the gel reservoir blister 83 and capillary installed in the aerosol product tunnel 82 in direct line with the tunnel input 84 and parallel with the tunnel output 78. There is no product passing through the tunnel 84, 82 which results in no pressure on the blister 83 and no movement of the gel 80. The top view shows the actuator 81 with an output opening 78 and a long narrow window 79 which reveals the leading edge of a gel 80 positioned at one end of the capillary in the long narrow window. The long narrow window 79 in conjunction with the position of the leading edge of the gel 80 renders and a visual representation of the amount of product that has been discharged from the aerosol can and passed through the actuator to the outside. In FIG. 13 the cross section view shows the actuator 81 with the gel reservoir blister 83 and capillary installed in the aerosol product tunnel 82 in direct line with the tunnel input 84 and parallel with the tunnel output 78. There is now product passing through the tunnel 84, 82 which results in pressure on the blister 83 and movement of the gel 80. The top view shows the actuator 81 with an output opening 78 and a long narrow window 79 which reveals the leading edge of a gel 80 positioned further into the capillary in the long narrow window. The long narrow window 79 in conjunction with the position of the leading edge of the gel 80 renders and records a visual representation of the amount of product that has been discharged from the aerosol can and passed through the actuator to the outside. In FIG. 14 the cross section view shows the actuator 81 with the gel reservoir blister 83 and capillary installed in the aerosol product tunnel 82 in direct line with the tunnel input 84 and parallel with the tunnel output 78. The product continues to pass through the tunnel 84, 82 which results in pressure on the blister 83 and additional movement of the gel 80. The top view shows the actuator 81 with an output opening 78 and a long narrow window 79 which reveals the leading edge of a gel 80 positioned further into the capillary in the long narrow window. The long narrow window 79 in conjunction with the position of the leading edge of the gel 80 renders and records a visual representation of the amount of product that has been discharged from the aerosol can and passed through the actuator to the outside. In FIG. 15 the cross section view shows the actuator 81 with the gel reservoir blister 83 and capillary installed in the aerosol product tunnel 82 in direct line with the tunnel input 84 and parallel with the tunnel output 78. The remaining product continues to pass through the tunnel 82, 84 which results in pressure on the blister 83 and additional movement of the gel 80. The top view shows the actuator 81 with an output opening 78 and a long narrow window 79 which reveals the leading edge of a gel 80 positioned at the end of the capillary in the long narrow window. The long narrow window 79 in conjunction with the position of the leading edge of the gel 80 renders and records a visual representation of the amount of product that has been discharged from the aerosol can and passed through the actuator to the outside.

Figure 27:
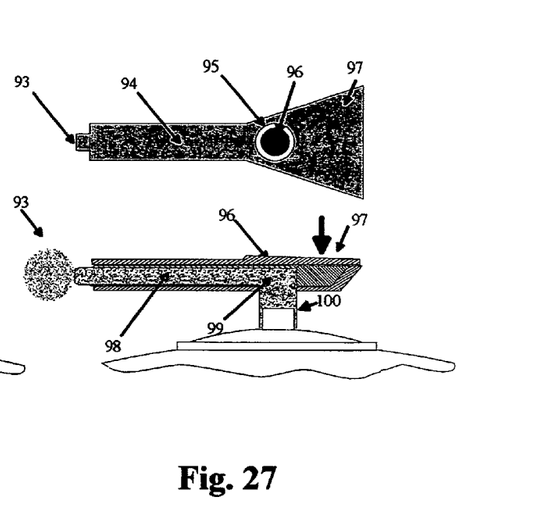
Figure 28:
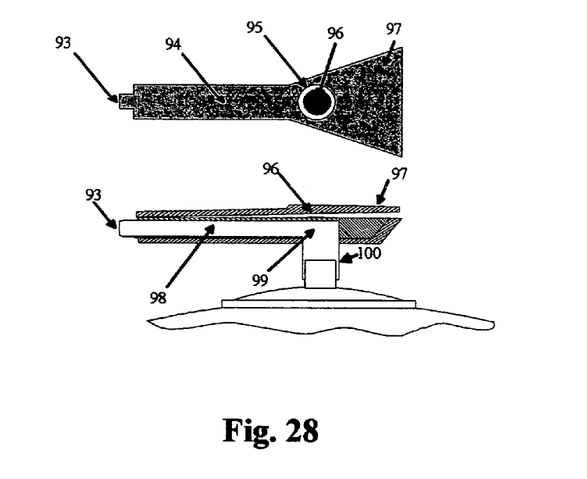

Another embodiment of the invention is shown in FIGS. 16 through 21. In this embodiment the gel in the blister reservoir is compressed directly by the pressure of the force applied to the actuator to overcome the valve pressure that releases product relevant to the amount of pressure. In this embodiment it is not necessary for product to come into direct contact with the product and compress the gel in the reservoir. The pressure required to compress the gel in the reservoir is simultaneously applying the same pressure to the aerosol valve. If the pressure required to overcome the valve and release product is substantially the same as the pressure required to move gel from the reservoir and into the capillary a history of valve activity will be rendered by the position of the leading edge of the gel in the capillary. The history of valve activity as shown in the position of the gel in the capillary is an indication of product released from the aerosol can. The viscosity of the gel material will be high enough to offer resistance and a memory effect in that once the gel is moved by a given force or pressure it will remain in place until it is moved again. In FIG. 16 there is no pressure applied to the hinged 89 actuator activation mechanism point 88 which results in no pressure applied to the valve opening 92 and no movement of product through the actuator tunnel 90. The gel reservoir blister 91 and capillary 86 are located above the tunnel and below the actuator activation point 88. The leading edge 87 of the gel in the capillary 86 is at the start position in that there is no pressure on the actuator activation point 88 resulting in no pressure on the gel reservoir blister 91 rendering a recording of no movement of product through the actuator. In FIG. 17 there is pressure applied to the hinged 89 actuator activation mechanism point 88 which results in pressure applied to the valve opening 92 and movement of product through the actuator tunnel 90. The gel reservoir blister 91 and capillary 86 are located above the tunnel and below the actuator activation point 88. The leading edge 87 of the gel in the capillary 86 moves into the capillary 86 due to the pressure on the actuator activation point 88 resulting in pressure on the gel reservoir blister 91 rendering a recording of movement of product through the actuator. In FIG. 18 there is no pressure applied to the hinged 89 actuator activation mechanism point 88 which results in no pressure applied to the valve opening 92 and no additional movement of product through the actuator tunnel 90. The gel reservoir blister 91 and capillary 86 are located above the tunnel and below the actuator activation point 88. The leading edge 87 of the gel in the capillary 86 does not continue to move in that there is no pressure on the actuator activation point 88 resulting in no pressure on the gel reservoir blister 91 rendering a recording of no additional movement of product through the actuator. In FIG. 19 there is pressure applied to the hinged 89 actuator activation mechanism point 88 which results in pressure applied to the valve opening 92 and movement of additional product through the actuator tunnel 90. The gel reservoir blister 91 and capillary 86 are located above the tunnel and below the actuator activation point 88. The leading edge 87 of the gel in the capillary 86 moves further into the capillary 86 due to the pressure on the actuator activation point 88 resulting in pressure on the gel reservoir blister 91 rendering a recording of movement of additional product through the actuator. In FIG. 20 there is no pressure applied to the hinged 89 actuator activation mechanism point 88 which results in no pressure applied to the valve opening 92 and no additional movement of product through the actuator tunnel 90. The gel reservoir blister 91 and capillary 86 are located above the tunnel and below the actuator activation point 88. The leading edge 87 of the gel in the capillary 86 does not continue to move in that there is no pressure on the actuator activation point 88 resulting in no pressure on the gel reservoir blister 91 rendering a recording of no additional movement of product through the actuator. In FIG. 21 there is pressure applied to the hinged 89 actuator activation mechanism point 88 which results in pressure applied to the valve opening 92 and additional movement of product through the actuator tunnel 90. The gel reservoir blister 91 and capillary 86 are located above the tunnel and below the actuator activation point 88. The leading edge 87 of the gel in the capillary 86 continues to move in that there is pressure on the actuator activation point 88 resulting in pressure on the gel reservoir blister 91 rendering a recording of additional and final movement of product through the actuator.

Another embodiment of the invention is shown in FIGS. 22 through 28. The actuator design is the same as the actuator in FIGS. 16 through 21 with the exception of the gel mechanism. The embodiment shown in FIGS. 22 through 28 does not have a capillary channel but only a mound of gel 96 positioned under the hinged actuator activation point 97 which contains a transparent window 95. The mound of gel 96 is designed to compress and expand under the window 98 creating the visual effect of small circle getting larger and larger as the product is dispensed from the aerosol can containing the actuator. The viscosity of the gel material will be high enough to offer resistance and a memory effect in that once the gel is moved by a given force or pressure it will remain in place until it is moved again. In FIG. 22 there is no pressure applied to the hinged actuator activation mechanism point 97 which results in no pressure applied to the valve opening 100 and no movement of product 93 through the actuator tunnel 98. The gel mound 96 is located above the tunnel 99 and below the transparent window 95 in the actuator activation point 97. The leading edge of the gel mound circumference in the window 95 is at the start position in that there is no pressure on the actuator activation point 97 resulting in no pressure on the gel mound 96 rendering a recording of no movement of product 93 through the actuator. In FIG. 23 there is pressure applied to the hinged actuator activation mechanism point 97 which results in pressure applied to the valve opening 100 and movement of product 93 through the actuator tunnel 90. The gel mound 96 is located above the tunnel 99 and below the transparent window 95 in the actuator activation point 97. The leading edge of the gel mound circumference in the window 95 moves outward due to the pressure on the actuator activation point 97 resulting in pressure on the gel mound 96 rendering a recording of movement of product 93 through the actuator. In FIG. 24 there is no pressure applied to the hinged actuator activation mechanism point 97 which results in no pressure applied to the valve opening 100 and no movement of product 93 through the actuator tunnel 98. The gel mound 96 is located above the tunnel 99 and below the transparent window 95 in the actuator activation point 97. The leading edge of the gel mound circumference in the window 95 is at the previous position in that there is no pressure on the actuator activation point 97 resulting in no pressure on the gel mound 96 rendering a recording of no movement of product 93 through the actuator. In FIG. 25 there is pressure applied to the hinged actuator activation mechanism point 97 which results in pressure applied to the valve opening 100 and movement of product 93 through the actuator tunnel 90. The gel mound 96 is located above the tunnel 99 and below the transparent window 95 in the actuator activation point 97. The leading edge of the gel mound circumference in the window 95 moves further outward due to the pressure on the actuator activation point 97 resulting in pressure on the gel mound 96 rendering a recording of additional movement of product 93 through the actuator. In FIG. 26 there is no pressure applied to the hinged actuator activation mechanism point 97 which results in no pressure applied to the valve opening 100 and no movement of product 93 through the actuator tunnel 98. The gel mound 96 is located above the tunnel 99 and below the transparent window 95 in the actuator activation point 97. The leading edge of the gel mound circumference in the window 95 is at the previous position in that there is no pressure on the actuator activation point 97 resulting in no pressure on the gel mound 96 rendering a recording of no movement of product 93 through the actuator. In FIG. 27 there is pressure applied to the hinged actuator activation mechanism point 97 which results in pressure applied to the valve opening 100 and movement of product 93 through the actuator tunnel 90. The gel mound 96 is located above the tunnel 99 and below the transparent window 95 in the actuator activation point 97. The leading edge of the gel mound circumference in the window 95 moves further outward due to the pressure on the actuator activation point 97 resulting in pressure on the gel mound 96 rendering a recording of additional movement of product 93 through the actuator. In FIG. 28 the aerosol is empty and there is no pressure applied to the hinged actuator activation mechanism point 97 which results in no pressure applied to the valve opening 100 and no movement of product 93 through the actuator tunnel 98. The gel mound 96 is located above the tunnel 99 and below the transparent window 95 in the actuator activation point 97. The leading edge of the gel mound circumference in the window 95 is at the final position in that there is no pressure on the actuator activation point 97 resulting in no pressure on the gel mound 96 rendering a recording of no movement of product 93 through the actuator.

Figure 29:
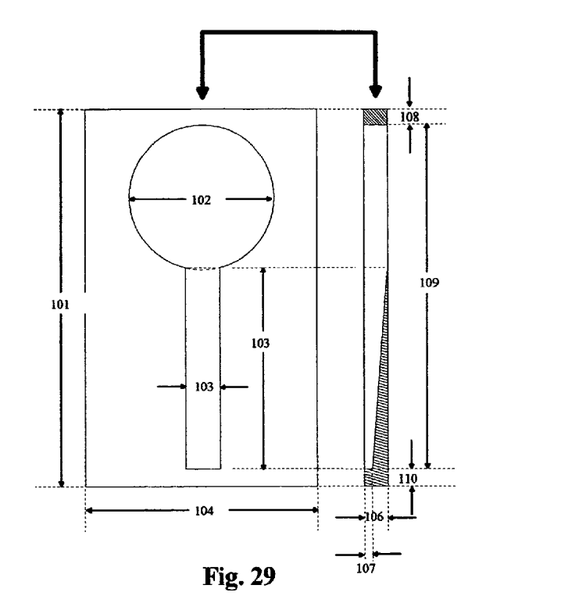
FIGS. 29, 30, 31, 32, 33, 34, 35 & 36 are top and cross sectional views of an isolated aerosol capacity indicator with the gel reservoir, capillary channel and other components formed and molded in a solid housing which records intermittent and continuous pressure applied to the indicator.
Figure 30:
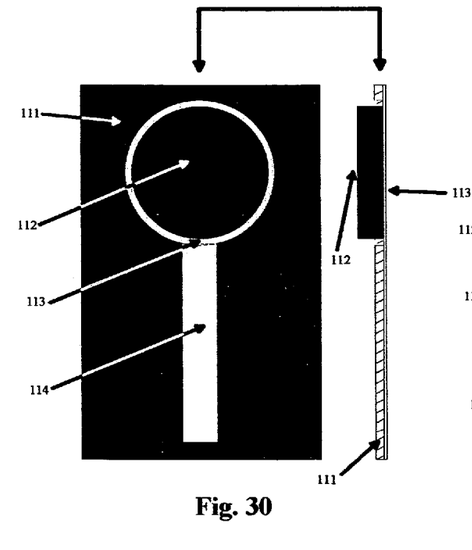
Figure 31:
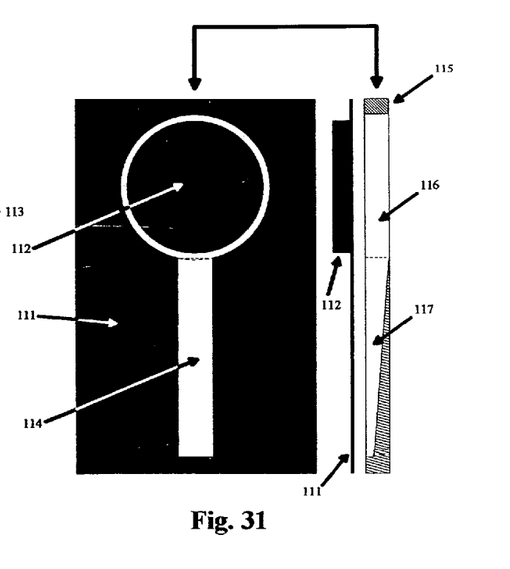
Figure 32:
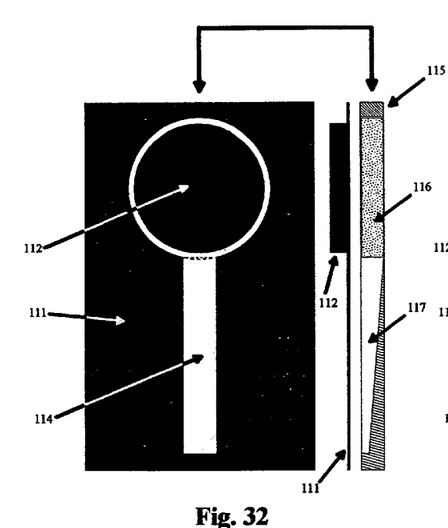
Figure 33:
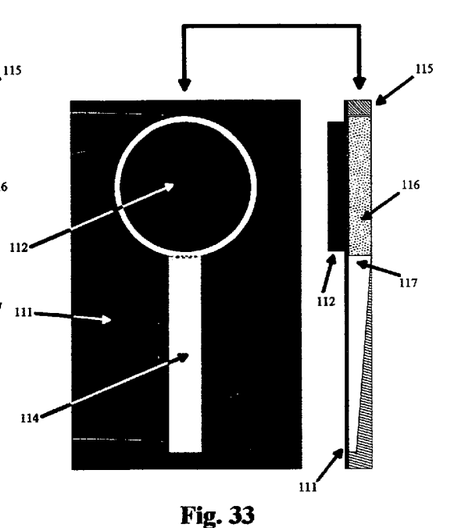
Figure 34:
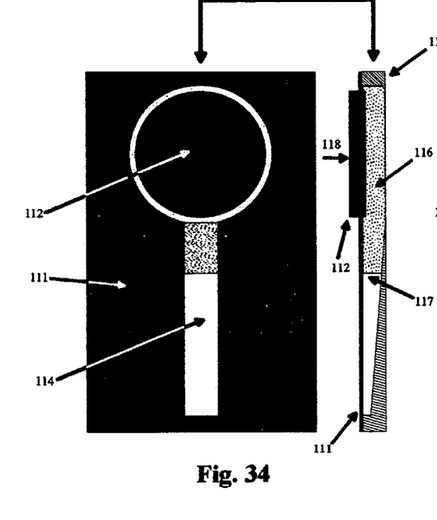
Figure 35:
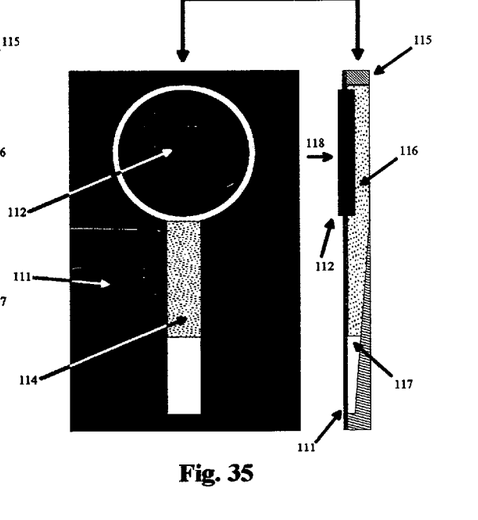
Figure 36:
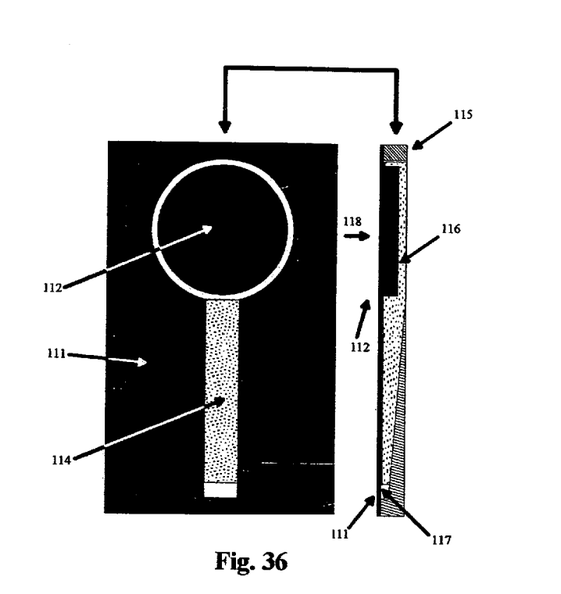

Another embodiment of the invention is shown in FIGS. 29 through 36 which is an indicator in isolation in that it is not a component of an aerosol actuator. This embodiment can be installed in an actuator as well as a variety of other devices that require a record of applied pressure. The indicator is composed of two parts as shown in FIGS. 29 and 30. In FIG. 29 a dimensional top and cross section view is shown. In FIG. 30 a top view of the two component indicator is shown and in FIG. 31 a top and cross sectional view of the two component system is shown. The indicator is based on the embodiments described above wherein a gel and capillary system are employed in a design that utilizes a housing which contains a reservoir cavity and capillary channel molded into said housing. In FIGS. 30 and 31 the indicator is made up of a housing 111 with a cavity 116 and an inclined capillary channel 117 formed out of the housing with a thin transparent film with a button adhered to the film placed over the housing 111 with the button 112 positioned over the gel reservoir cavity 116. In FIGS. 32 and 33 a high viscosity gel is installed and sealed in the indicator. In the top and cross sectional view of FIG. 34 the button 112, 118 is pressed applying pressure to the gel cavity 116 forcing the gel to enter the capillary channel 114 a given distance depending on the amount of pressure applied to the button rendering a visual indication of amount and duration of pressure applied. In the top and cross sectional view of FIG. 35 the button 112, 118 continues being pressed applying pressure to the gel cavity 116 forcing additional gel to enter the capillary channel 114 a given distance depending on the amount of pressure applied to the button continuing to render a visual indication of amount and duration of pressure applied. In the top and cross sectional view of FIG. 36 the button 112, 118 is pressed applying pressure to the gel cavity 116 forcing the remaining gel to enter the capillary channel 114 filling the remaining distance rendering a visual indication of amount and duration of pressure applied.

Figure 37:
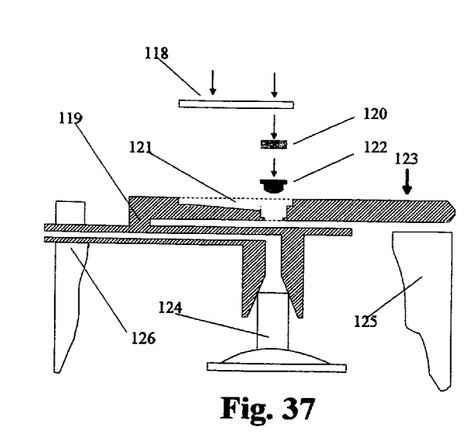
FIGS. 37 & 38 are cross sectional views of an aerosol capacity indicator with the gel reservoir, capillary channel and other components formed and molded into an actuator rendering a self contained indicator and actuator which records intermittent and continuous pressure applied to the indicator.
Figure 38:
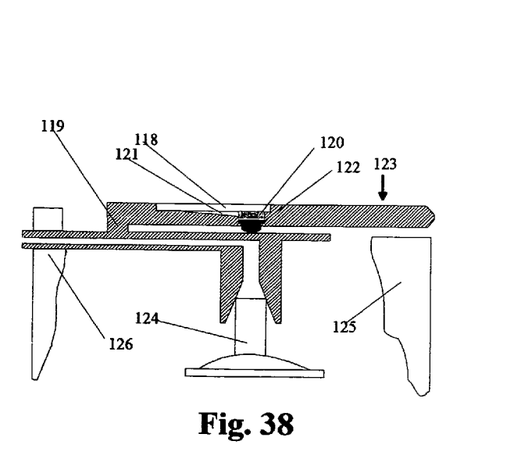

Another embodiment is shown in FIGS. 37 and 38 which shows cross sectional views of the indicator designed as part of an aerosol actuator. An exploded view is shown in FIG. 37 showing the indicator components molded into a hinged 119 assembly 123 that is part of the actuator shell 123, 126 incorporating the transparent window seal 119, the gel 120, the inclined capillary channel 121 and a separate trapped button 122 installed in the actuator that is placed over an aerosol valve 124. FIG. 38 shows all the components in place and ready for operation.

Figure 39:
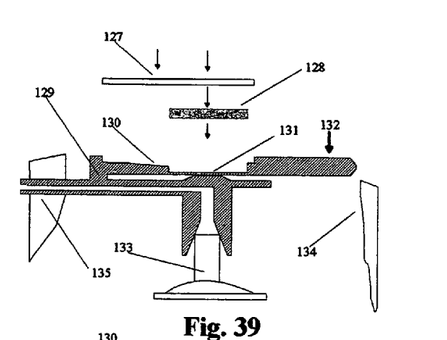
FIGS. 39, 40, 41 & 42 are cross sectional and top views of another aerosol capacity indicator with the gel reservoir, capillary channel and other components formed and molded into an actuator rendering a self contained indicator and actuator which records intermittent and continuous pressure applied to the indicator.
Figure 40:
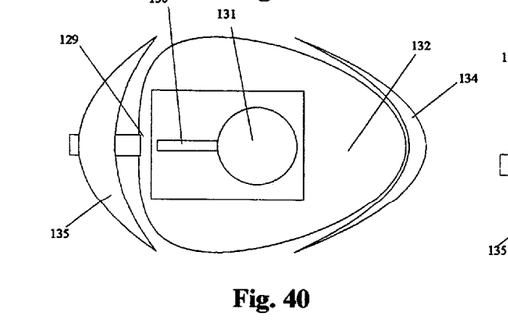
Figure 41:
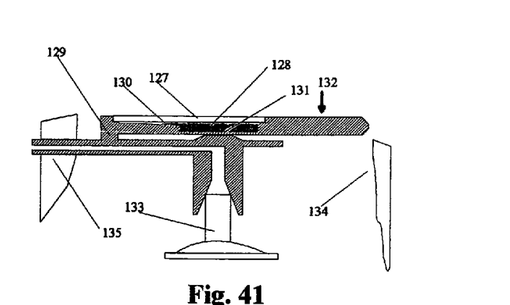
Figure 42:
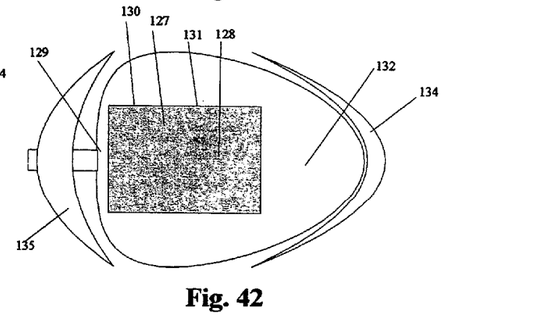

Another embodiment of the invention is shown in FIGS. 39 through 42. The figures show a novel system that eliminates the requirement of a separate button by use of a flexible thin wall which is in contact with a bump molded in the actuator. FIGS. 39 and 40 is a cross sectional and top view of an indicator designed as part of an aerosol actuator. In FIG. 39 the components are shown in preassembled state. The indicator contains all the features of the embodiments described above with a hinged 129 actuator activation site 132, the gel cavity 131 with an ultra thin wall extending out to the inclined capillary channel 130 and the gel 128 which will be sealed by the transparent cover 127. FIG. 40 is the top view showing the indicator components such as the gel cavity 131 and capillary channel before the gel and transparent cover 127 are installed. FIGS. 41 and 42 are a cross sectional and top view of the indicator showing the gel 131 and transparent cover 127 installed in the indicator. The indicator records pressure applied to the actuator and aerosol valve when the bump in the actuator presses on the thin wall of the cavity 131 due to pressure applied at the actuator activation site 132. The total amount of pressure and duration of pressure applied to the actuator is representative of the amount of product released from the aerosol.

What is claimed:

1. An elongated display device and an elongated delivery tunnel for an aerosol container, the elongated display device and the elongated delivery tunnel extending adjacent and parallel to one another, the elongated display device displaying the amount of product remaining in the aerosol container, one end portion of the elongated delivery tunnel having an input passage adapted to be installed on the top portion of the actuator tube of an aerosol container substantially at a right angle to the length of the actuator tube, the lower portion of the actuator tube, when depressed into the aerosol container, releasing a valve within the aerosol container for enabling the flow of the product through the valve, through the lower portion of the actuator tube, into the top portion of the actuator tube, and into the input passage of the elongated delivery tunnel adapted to be installed thereon, the elongated delivery tunnel having an elastic passage with one end thereof connected to the input passage of the elongated delivery tunnel, and an output passage portion connected to the other end portion of the elastic passage and leading to a discharge opening, the elongated display device being disposed in transparent material extending adjacent to the elastic passage and the output passage of the elongated delivery tunnel, the elongated display device having an elastic passage portion adjacent to the elastic passage of the elongated delivery tunnel and a downstream passage portion extending adjacent to the output passage portion of the elongated delivery tunnel, gel indicating material being disposed within the elastic passage of the delivery tunnel and the downstream passage portion of the elongated display device being disposed in transparent material extending adjacent to the elastic passage and the output passage portion of the elongated delivery tunnel, an increasing pressure and resulting expansion of the elastic passage of the elongated delivery tunnel on the elastic passage portion of the elongated display device as the product is released from the aerosol container, causing the gel indicating material disposed within the elastic passage portion of the elongated display device to advance progressively into the downstream passage portion of the elastic passage portion, with a resulting contraction of the elastic passage portion of the elongated display device, thereby displaying the amount of product remaining in the aerosol container.

2. An elongated display device and an elongated delivery tunnel for an aerosol container, the elongated display device and the elongated delivery tunnel extending adjacent and parallel to one another, the elongated display device displaying the amount of product remaining in the aerosol container, one end portion of the elongated delivery tunnel having an input passage adapted to be installed on the top portion of the actuator tube of an aerosol container substantially at a right angle to the length of the actuator tube, the lower portion of the actuator tube, when depressed into the aerosol container, releasing a valve within the aerosol container for enabling the flow of the product through the valve, through the lower portion of the actuator tube, into the top portion of the actuator tube, and into the input passage of the elongated delivery tunnel adapted to be installed thereon, the elongated delivery tunnel having an output passage connected to the input, passage thereof leading to a discharge opening, the elongated display device being disposed in transparent material extending adjacent to the input passage portion and the output passage of the elongated delivery tunnel, the elongated display device having an elastic passage portion adjacent to the top portion of the actuator tube of the aerosol container and a downstream passage portion extending adjacent to the output passage of the elongated delivery tunnel, gel indicating material being disposed within the elastic passage portion and the downstream passage portion of the elongated display device, an increasing pressure on the elastic passage portion of the elongated display device as the product is released from the aerosol container, causing the gel indicating material disposed within the elastic passage portion of the elongated display device to advance progressively into the downstream passage portion of the elastic passage portion, with a resulting contraction of the elastic passage portion, thereby displaying the amount of product remaining in the aerosol container.

3. An elongated display device and an elongated delivery tunnel for an aerosol container, the elongated display device and the elongated delivery tunnel extending adjacent and parallel to one another, the elongated display device displaying the amount of product remaining in the aerosol container, one end portion of the elongated delivery tunnel having an input passage adapted to be installed on the top portion of the actuator tube of an aerosol container substantially at a right angle to the length of the actuator tube, the lower portion of the actuator tube, when depressed into the aerosol container, releasing a valve within the aerosol container for enabling the flow of the product through the valve, through the lower portion of the actuator tube, into the top portion of the actuator tube, and into the input passage of the elongated delivery tunnel adapted to be installed thereon, the elongated delivery tunnel having an output passage connected to the input, passage thereof leading to a discharge opening, the elongated display device being disposed in transparent material extending adjacent to the input passage and the output passage of the elongated delivery tunnel, the elongated display device having an elastic passage portion adjacent to the top portion of the actuator tube of the aerosol container and a downstream passage portion extending adjacent to the output passage of the elongated delivery tunnel, gel indicating material being disposed within the elastic passage portion and the downstream passage portion of the elongated display device, an elongated actuator lever hinged at one end adjacent to the output passage of the elongated delivery tunnel and having an opposite end extending over and adjacent to the elastic passage portion of the elongated display device, an increasing pressure of the opposite end of the actuator lever on the elastic passage portion of the elongated display device as the product is released from the aerosol container, causing the gel indicating material disposed within the elastic passage portion of the elongated display device to advance progressively into the downstream passage portion of the elastic passage portion, with a resulting contraction of the elastic passage portion, thereby displaying the amount of product remaining in the aerosol container.

4. A display device and an elongated delivery tunnel for an aerosol container, and an elongated actuator lever hinged at one end and adjacent to an output passage portion of the elongated delivery tunnel and having an opposite end extending over and adjacent to an opposite end portion of the elongated delivery tunnel, the elongated actuator lever and the elongated delivery tunnel extending adjacent and parallel to one another, the elongated actuator lever having a window for displaying the amount of product remaining in the aerosol container, one end portion of the elongated delivery tunnel having an input passage adapted to be installed on the top portion of the actuator tube of an aerosol container, substantially at a right angle to the length of the actuator tube, the lower portion of the actuator tube, when depressed into the aerosol container, releasing a valve within the aerosol container for enabling the flow of the product through the valve, through the lower portion of the actuator tube, into the top portion of the actuator tube, and into the input passage of the elongated delivery tunnel adapted to be installed thereon, the elongated delivery tunnel having an output passage connected to the input passage thereof and leading to a discharge opening, a portion of gel mounted on an outside of the input passage of the elongated delivery tunnel, an increasing pressure on the elongated actuator lever applies increasing pressure on the gel mounted on the outside of the input passage by contact with the window in the elongated actuator lever as the product is released from the aerosol container, whereby the gel material expands with the increasing pressure and retains such expansion as an indication through the window of the elongated actuator lever of the amount of product remaining in the aerosol container.

* * * * *